June 26, 1956
R. B. MATTHEWS
2,752,457
CONDITION RESPONSIVE CONTROL DEVICE
Filed July 16, 1952
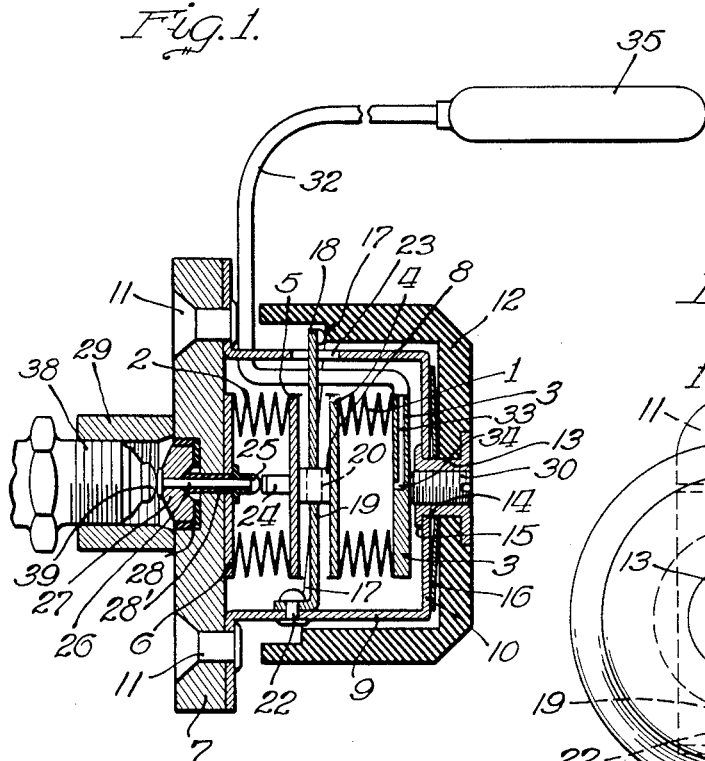
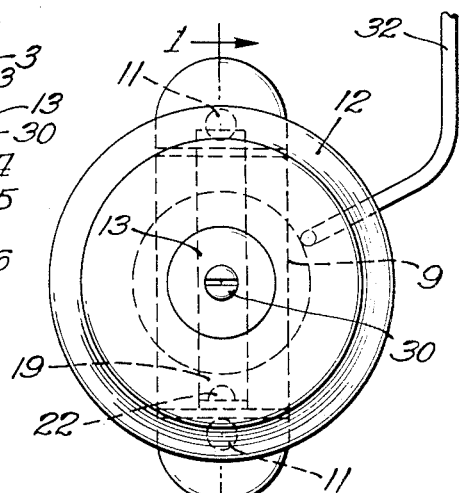
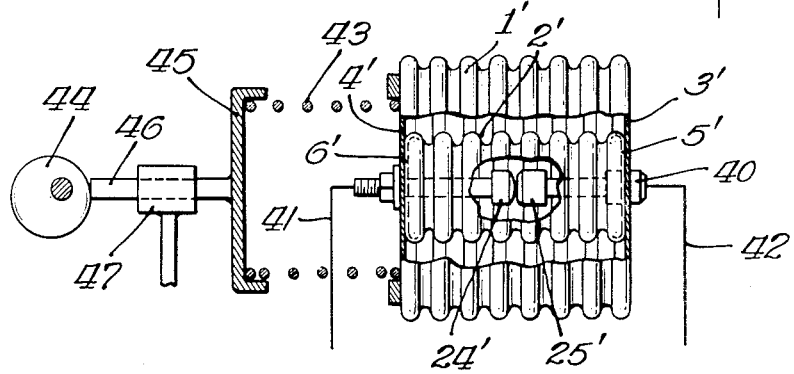
INVENTOR.
Russell B. Matthews
BY
Brown, Jackson, Boettcher & Dienner
Attys.

United States Patent Office 2,752,457
Patented June 26, 1956

2,752,457

CONDITION RESPONSIVE CONTROL DEVICE

Russell B. Matthews, Wauwatosa, Wis., assignor to Milwaukee Gas Specialty Company, Milwaukee, Wis., a corporation of Wisconsin Application July 16, 1952, Serial No. 299,118

20 Claims. (Cl. 200—140)

This invention relates, in general, to condition responsive control devices, and more particularly to a temperature responsive device for controlling a low voltage electric circuit as, for example, those including a thermoelectric generator as a source of electric energy, and for controlling energization of electromagnetic devices powered from such sources of electric energy.

One embodiment of the invention which will be described hereinafter in connection with the drawing is particularly adapted for use, for example, with refrigerator temperature control apparatus of the type disclosed and claimed in the copending application of Gerald E. Dietz and Adolph J. Hilgert, Serial No. 299,274, field July 16, 1952.

Another embodiment which will be described in connection with the drawing is particularly adapted for use, for example, with temperature control apparatus for heaters of the type disclosed and claimed in the copending application of Gerald E. Dietz and Adolph J. Hilgert, Serial No. 292,488, filed June 9, 1952. Both embodiments further have particular utility when employed in an electric circuit and apparatus including such control devices as more fully disclosed and claimed in the copending application of Adolph J. Hilgert and Russell B. Matthews, Serial No. 289,242, filed May 22, 1952. It is to be understood, however, that the present invention is not limited to such particular devices or to the particular uses to be described but may be embodied in other forms and used for other purposes.

One of the main objects of the present invention is to provide condition responsive means, and more particularly temperature responsive means, utilizing a bellows or expansible and contractible enclosure which may be filled with a nonoxidizing inert fill in which the circuit controlling contacts may be enclosed and sealed, and condition responsive means which may be in the form of a second expansible and contractible enclosure filled with a condition responsive fill, and more particularly a temperature responsive fill, such condition responsive means coacting with the contact encapsulating enclosure and effective through such coaction, responsive, for example, to temperature changes, to produce relative movement of the contacts to control the circuit.

Another object is to provide a plural bellows or expansible and contractible enclosure form of device of the character set forth which may operate to establish the flow of current through the circuit responsive, for example, to a rise in temperature, and which may have a first enclosure expansible and contractible with changes in temperature and coacting with a second expansible and contractible contact containing enclosure for contracting the second enclosure by expansion of the first enclosure to produce relative movement between the contacts effective to establish the flow of current.

Another object is to provide a plural bellows or expansible and contractible enclosure form of device of the character set forth in the preceding paragraph wherein contraction of the first enclosure, for example, upon a drop in temperature is accompanied by expansion of the second enclosure to produce relative movement between the contacts effective to interrupt the flow of current.

Another object is to provide a plural bellows or expansible and contractible enclosure form of device of the character set forth which may operate to establish the flow of current through the circuit responsive, for example, to a drop in temperature, and which may have a first enclosure expansible and contractible with changes in temperature and coacting with a second expansible and contractible contact containing enclosure for expanding the second enclosure by expansion of the first enclosure to produce relative movement between the contacts effective to interrupt the flow of current.

Another object is to provide a plural bellows or expansible and contractible enclosure form of device of the character set forth in the preceding paragraph wherein contraction of the first enclosure, for example, upon a drop in temperature, is accompanied by contraction of the second enclosure to produce relative movement between the contacts effective to establish the flow of current.

Another object is to provide a plural bellows or expansible and contractible enclosure form of device wherein the condition responsive enclosure is filled with a temperature responsive fill whereas the contact containing enclosure is filled with a non-oxidizing inert fill so that the contacts will be out of the temperature responsive fill and at the same time protected, for example, against contamination or oxidation or formation of layers thereon.

Another object is to provide temperature responsive means of the character described of extremely great sensitivity and promptness of response to the medium to which it is responsive, and more particularly to provide means of the character described which will be so sensitive to temperature changes in the medium to which it is responsive as to eliminate need for "anticipating" means, but which, on the other hand, will not result in too frequent cycling of the temperature controlling apparatus with which it is employed.

Another object is to provide temperature responsive means of the character described particularly adapted to control low voltage electric circuits, for example, circuits having as their source of electric energy a thermoelectric generator or the like, and more particularly means of the character described which means introduces a minimum of contact resistance into such a circuit.

Another object is to provide a temperature responsive means of the character described which when utilized in a circuit including an electromagnetic control device having an inherent differential will not, aside from the thermal lag of the temperature responsive means, contribute to the differential of the apparatus, thereby rendering such differential dependent solely upon the electric constants of the circuit.

Another object is to provide temperature responsive means of the character described in which the temperature differential of the device is determined by the thermal lag therein, and more particularly means of the character described in which mechanical contributions to the temperature differential have been substantially eliminated.

Another object is to provide temperature responsive means of the character described in which the temperature differential of the device may be independent of contact spacing and hence independent of manufacturing tolerances, and thus can be maintained constant both from device to device in production, and throughout the life of a given device regardless of contact wear and air gap.

Another object is to provide temperature responsive means of the character described in which range adjustments or temperature settings do not affect the differential of the device, the differential remaining fixed and constant.

Another object is to provide temperature responsive means of the character described which may, when employed in low voltage circuits of the character aforementioned, be employed to vary the resistance of the circuit and thus control energization of the electromagnetic or other electrical apparatus in the circuit.

Another object is to provide temperature responsive circuit controlling means of the character described which are slow-make, slow-break in operation but which nevertheless will not cause fluttering operation of electrical apparatus in the circuit during making or breaking thereof.

Another object is to provide temperature responsive circuit controlling means of the character described which require an extremely small amount of power or movement for operation thereby rendering the means extremely sensitive to temperature changes, and more particularly requiring so little power that, for example, for temperature control apparatus for heaters, actuating bellows employing temperature responsive fills below atmospheric pressure may be utilized, thereby rendering the device fail-safe by interrupting the flow of current to shut off the flow of fuel in the even of bellows leakage or rupture.

Another object is to provide temperature responsive circuit controlling means for refrigerator temperature control apparatus which will provide with actuating bellows or enclosure employing temperature responsive fills below atmospheric pressure render the device fail-safe by establishing a flow of current in the circuit to maintain refrigeration in the event of bellows leakage or rupture.

Another object is to provide novel, simple and improved temperature adjusting means for the temperature control device of the character described.

Another object is to provide a device of the character described that may be used so that it will be responsive to the temperature adjacent to the condition responsive enclosure or so that it will be responsive to the temperature at a remote location; and more particularly, a device wherein the control knob and temperature setting parts may be located at approximately the same position or separated for use at different locations.

Another object is to provide a temperature control device of the character described having the condition responsive enclosure and the contact encapsulating enclosure in novel relation and coacting in a novel manner and having temperature adjusting means in novel relation with respect to the condition responsive and contact encapsulating enclosures.

Another object is to provide a temperature control device for use, for example, with refrigerator temperature control apparatus and with which the refrigerator may be set for continuous run, for example, for freezing purposes and so as not to cycle during such setting.

Another object is to provide a temperature control device of the character described which is self-compensating for changes in atmospheric or surrounding pressure.

Another object is to provide a temperature control device affording with different temperature responsive fills a novel combination of fail-safe aspects as will hereinafter appear.

Further objects and advantages and numerous adaptations of the invention will appear from the following detailed description taken in connection with the accompanying drawing showing two embodiments of the invention, it being understood that the invention is limited only within the scope of the appended claims and not to the particular embodiments selected for illustration.

Figure 1 is an axial sectional view of one form of temperature control device embodying the present invention taken on the line 1—1 of Figure 2 and showing a remote temperature responsive bulb applied thereto;

Figure 2 is a view of the right-hand end of the device shown in Figure 1; and

Figure 3 is a view of another form of temperature control device embodying the present invention partially in elevation and partially broken away and in section.

Referring now to the drawing, the embodiment of the invention shown in Figures 1 and 2 comprises a first hermetically sealed expansible and contractible bellows or enclosure 1 and a second hermetically sealed expansible and contractible bellows or enclosure 2.

The bellows 1 is closed at one end by an end wall 3 which may be movable for adjusting or setting the temperature at which the device operatively controls the circuit as will presently be described. The opposite end of the bellows 1 is closed by a movable end wall 4. The bellows 2 is closed at one end by a movable end wall 5 spaced from the end wall 4 of the bellows 1. The opposite end of the bellows 2 is closed by an end wall 6 attached to a fixed mounting or base plate 7. The bellows 1 and 2 are disposed end to end with a connecting or actuating connection 8 interposed between and secured at opposite ends to the end walls 4 and 5, for example, at the common axis thereof.

A bracket 9 has a generally U-shaped intermediate portion which straddles the bellows 1 and 2 with the wall 10 thereof in generally diametrical relation to the adjacent end wall 3 of the bellows 1. The bracket 9 is fastened, for example, to the plate 7 by rivets 11 or other suitable fastening means.

A dial or temperature adjusting knob 12 has fixed in its outer end at the axis thereof a sleeve 13 which turns or rotates with the knob 12 and is mounted at 14 for rotation or turning movement in an opening in the wall 10 of the bracket 9, for example, by extending the sleeve 13 through the opening in the bracket and peening its inner end over at 15. A spring washer 16 is interposed between the knob 12 and the wall 10 of the bracket 9. The knob 12 has an annular cam surface 17 which is inclined and cooperates with the free end 18 of a spring arm or lever 19 which extends diametrically between the adjacent ends 4 and 5 of the bellows 1 and 2 and through a slot 20 in the connection 8 preferably with the slot 20 of a width to provide clearance between the connection 8 and the spring lever 19. The opposite end of the spring lever 19 is fixed to the bracket 9, for example, by a rivet 22. The bracket 9 has an opening 23 through which the spring lever 19 extends.

Encapsulated within and fixed to the movable end 5 of the bellows 2 is a contact 24 which has, for example, a flat inner end which cooperates with the adjacent end of a contact 25. The contact 25 may have its inner end which cooperates with the contact 24 rounded as shown. A stem 26 extends from the contact 25 out through the end wall 6 and plate 7 and has at its outer end a contact tip 27 insulated from the plate 7, for example, by an insulator 28 and at 28'. The plate 7 carries an internally threaded sleeve 29 into which the attaching nut 38 of a lead for a thermoelectric generator such, for example, as a thermocouple, is adapted to be screwed as disclosed in the copending application of Earl A. Fritz, Serial No. 186,390, filed September 23, 1950. In that case, the lead comprises an outer tubular lead conductor and an inner lead conductor having a terminal contact 39 which is clamped into contact with contact tip 27 by the attaching nut. One side of the thermoelectric generator, for example, thermocouple or other low voltage circuit, is thus connected to the contact 25 through the contact tip 27 and stem 26. The other side of the circuit is connected to the contact 24, for example, through the sleeve 29, plate 7, end wall 6, bellows 2 and end wall 5.

A factory adjustment screw 30 is screwed into the sleeve 13 and cooperates at its inner end with the adjacent end wall 3 of the bellows 1, for example, for factory adjustment of the device.

Where it is desired to make the temperature responsive device responsive to variations in temperature remote from the bellows 1, a capillary tube 32 of a length to extend to the desired position may be attached, for example, to the end wall 3 of the bellows 1 in position opening through passages 33 and 34 in the end wall 3 into the interior of the bellows 1. The opposite end of the tube 32 opens into a temperature sensing bulb 35 which may be positioned at the desired remote location.

The bellows 2 is preferably filled with a non-oxidizing inert fill which will prevent contamination or oxidation of the contacts 24 and 25 or formation of layers or other deleterious action on these contacts. Hydrogen ($H_2$), nitrogen ($N_2$) or any other non-oxidizing gas are illustrative of suitable non-oxidizing inert fills for filling the contact encapsulating bellows 2 but it is to be understood that other fills which will prevent contamination and oxidation of the contacts 24 and 25 may be employed. With the contacts 24 and 25 in the bellows 2 and the fill therein, the contacts are out of the bellows 1 and the fill in this latter bellows.

The bellows 1, and where there is a bulb 35 and connecting tube 32, the bulb and tube are all filled with a temperature responsive fill which may be a volatile fill whose vapor pressure increases and decreases upon rise and drop in temperature, for example, within a refrigerator compartment where the device is used with refrigerator temperature control apparatus of the character disclosed and claimed in the copending application of Gerald E. Dietz and Adolph J. Hilgert, Serial No. 299,274, filed July 16, 1952. For such purposes the fill in the temperature responsive bellows 1 may, for example, be isobutane or methyl chloride ($CH_3Cl$) which under operating temperatures encountered in refrigerator control are above-atmospheric or have a pressure above atmospheric pressure. Also for such purposes the fill in the temperature responsive bellows 1 may, for example, be ethyl chloride ($C_2H_5Cl$) butane, Freon 2 (dichloromonofluoromethane) which under operating temperatures encountered in refrigerator control are sub-atmospheric or have a pressure below atmospheric pressure. It is to be understood that the aforementioned above-atmospheric and sub-atmospheric fills for filling the bellows 1 are merely illustrative and that other temperature or condition responsive fills may be employed.

By providing the separate bellows 2 enclosing the circuit control contacts 24 and 25 these contacts are removed from the environment of the temperature responsive bellows which tends to minimize one of the primary limitations in devices wherein the contacts are disposed within the temperature responsive bellows while at the same time preserving the operating advantages of the latter type of devices. More specifically, the addition of a second bellows in the instant device for enclosing the contacts increases the electrical capacity of the device in the sense that circuits of higher voltages may now be controlled without danger of break-down of the temperature responsive fill which limits the voltage in devices wherein the contacts are disposed within the temperature responsive bellows and thus in the temperature responsive fill therein. At the same time, however, the slow-make, slow-break characteristics and absence of snap-acting means and the like have been preserved thereby maintaining, if desired, the desired differential characteristics and contact resistance circuit control of devices according to the copending application of Adolph J. Hilgert, Serial No. 291,047, filed May 31, 1952. The aforesaid dual advantages are afforded in the instant device not only by the removal of the contacts from the temperature responsive fill but are also due to the fact that the contact enclosing bellows may be, as indicated, filled with an inert gas which in and of itself tends to minimize arcing.

The temperature responsive device with its first temperature responsive bellows 1 and its second bellows 2 with the enclosed contacts immersed in the non-oxidizing fill provides slow-make, slow-break contacts outside the volatile fill in the bellows 1 for use, for example, in the thermoelectric circuit of apparatus of the character illustrated and described in the hereinbefore identified copending application of Adolph J. Hilgert and Russell B. Matthews and which as utilized in such apparatus may function as a variable resistance in the thermoelectric circuit since in view of the small electric energy involved the thermoelectric circuit and hence the electromagnetically controlled valve or the like may be automatically controlled responsive to changes in temperature by merely varying the contact pressure of the contact 24 against the contact 25.

Where the device of the present application is used according to the aforementioned copending application of Adolph J. Hilgert and Russell B. Matthews, the electromagnetic operator inherently has a differential between its pick-up and drop-out values. The temperature responsive device of the present application when applied as described has the contacts 24 and 25 in series with the electromagnetic operator for controlling the flow of electric energy supplied by a single thermocouple or other thermoelectric generator or similar source of small electric energy to the electromagnetic operator in accordance with variations in the temperature to be controlled.

In apparatus of the aforementioned character, the differential required to pick up and drop out the electromagnetic control device, neglecting thermal lag of the temperature responsive means, is dependent solely upon the electric constants of the apparatus; that is, the pick-up and drop-out values of the electromagnetic control device in relation to the contact pressure in the condition responsive means. The inherent differential is so minimal as to be within the thermal lag of the temperature responsive device which in and of itself is much lower than in previously known devices. This is so because the differential of the temperature responsive device is not a mechanical one, as for example, inherent in snap-acting temperature responsive means necessary where higher powered circuits are employed and contacts must be broken quickly to minimize arcing. In the latter type of device the differential not only includes manufacturing tolerances in the mechanism but also an air gap between the contacts which varies as the contacts wear in use. Moreover, in such devices additional electric energy is necessary to supply the force necessary to overcome the snap mechanism and to power, for example, "anticipating" means which must be utilized if the apparatus is to have the required sensitivity particularly in connection with heat control. Such extra energy is not available from a thermocouple supplied low voltage circuit; but, on the other hand, such low voltage eliminates the necessity for snap-acting means.

It will be apparent that even where the temperature responsive device of the present invention is utilized in a circuit which has to be made and broken to control energization and actuation of other electrical apparatus in the circuit, the slow-make, slow-break characteristics of the present device afford the differential advantages heretofore mentioned. Since mechanical contributions to the temperature differential have been substantially eliminated from the temperature responsive device, the thermal lag thereof will be the principal differential determining factor. The thermal lag of the instant device, however, may be made so small as to render the sensitivity and promptness of response of the device at least as fast as the rate at which the temperature of the medium to which it is responsive can be changed. In fact, it has been found desirable in some cases to increase the thermal lag of the device to match it to such rate so that, on the one hand, anticipating means may be eliminated, while on the other hand, too rapid cycling of the temperature control apparatus does not occur.

Moreover, since mechanical contributions of the instant device to the differential thereof have been substantially eliminated, the differential is unaffected by range adjustments or changes in temperature setting by movement of the knob 12 and the temperature differential of the device therefore remains fixed and constant regardless of range setting. The enclosed contacts immersed in the non-oxidizing fill within the bellows 2 by protecting the contacts and preventing oxides or other layers tending to create contact resistance makes actuation of the electromagnetic control device by a low voltage circuit possible.

In use the temperature differential of the device (neglecting negligible rate of change of vapor pressure throughout the operating temperature range) remains constant throughout the operating temperature range since the differential is independent of the relative position of the contacts and when used according to the copending application of Adolph J. Hilgert and Russell B. Matthews is dependent only upon contact resistance as determined by contact pressure in relation to the inherent differential of the electromagnetic control device. The encapsulation of the contacts 24 and 25 inside the bellows 2 assures contact resistance for given contact pressure and thus the temperature responsive means, aside from the thermal lag therein, does not contribute to the differential of the contact resistance and if variable at all merely shifts the range of the device which may be automatically adjusted, for example, by the factory range adjustment screw 30.

Operation of the embodiment of the invention illustrated in Figures 1 and 2 is as follows:

When the temperature, for example, of the refrigerated air or other medium surrounding the bulb 35 or the bellows 1 where a connected bulb and tube are not employed rises above that set, for example, by the cooperation of the cam surface 17 with the spring arm 19 at the position to which the knob 12 is turned for the desired setting, the bellows 1 expands and the contact 24 gradually closes against contact 25 and the contact pressure builds up, for example, from about 0 pound pressure to at least the pressure where the resistance of the thermocouple circuit, or other circuit, is reduced to a value at which the electromagnetic operator is energized by the thermoelectric energy, for example, from the thermocouple (about 20 millivolts is generated by the heat of a pilot burner flame on one form of single thermocouple now marketed by Milwaukee Gas Specialty Company, assignee of the present application) and actuates the valve or other controlling member to the desired position.

Another major advantage, particularly true of the form of device shown in Figure 1 of the instant application, is that the device is self-compensating for changes in atmospheric or surrounding temperature. This stems from the fact that the two bellows tend to oppose each other and changes in atmospheric pressure acting alike on both bellows cancel out. This affords calibration advantages where the device is subject to fluctuations in atmospheric pressure in a given or different geographical location and more particularly where the device might be utilized in, for example, air conditioning equipment in aircraft or the like.

To further elucidate the last mentioned point, the bellows 2 in Figure 1 may be considered as a spring opposing expansion of the bellows 1. This is important in the sense that looking at bellows 1 alone, it provides a bias to the contacts 24 and 25 to the open position. The bellows 1 acts in opposition to the bias of the bellows 2 upon rise in temperature which increases the pressure of the temperature responsive fill of the bellows 1. The loading of the spring 19 also acts against the bias of the bellows 2 and the greater this loading, the less force the bellows 1 has to apply and, hence, the lower the temperature at which the contacts will be made or the pressure of the contact 24 against the contact 25 increased. Just the reverse is true upon drop in temperature when the bellows 1 tends to contract under its inherent bias and the bellows 2 tends to follow due to its inherent bias.

It follows that the spring 19 may be loaded sufficiently in opposition to the bias of bellows 2 to prevent the opening of the contacts 23 and 24 entirely, or reduction of pressure of contact 24 against contact 25, thereby affording the device a continuous run for freezing or the like when the device is used as a refrigeration control.

Upon drop of the order of a few tenths of a degree Fahrenheit or less in temperature at the temperature responsive means below that set by the knob and cooperation of the cam surface 17 with the spring arm 19, the bellows 1 contracts under the influence, for example, of the inherent resilience or bias in the wall of the bellows 1. This reduces the pressure of the contact 24 against the contact 25 at least to where the resistance of the circuit is increased to a value where the electromagnetic operator is deenergized and a valve or other controlling member is actuated to closed or other desired position.

With, for example, silver contacts, a contact pressure of only a few grams reduces the contact resistance to a very low value. The relation between contact pressure and contact resistance will vary for different shapes of contacts and for various contact materials.

Temperature responsive means of the character described requires an extremely small amount of power or movement for operation thereby rendering the means extremely sensitive to temperature changes and more particularly requiring so little power that, as previously set forth, for example, for refrigerator temperature control apparatus a sub-atmospheric fill may be employed for filling the bellows 1. This renders the device fail-safe by establishing a flow of current in the circuit to maintain refrigeration in the event of bellows leakage or rupture.

The spring arm 19 which cooperates with the cam surface 17 on the temperature setting knob 12 acts in the direction of expansion of the bellows 1 by the volatile fill therein and in amount according to the temperature setting of the device. This is illustrative and may be varied within the scope of the broader aspects of the present invention.

Referring now to the embodiment of the invention shown in Figure 3, in this embodiment the second contact encapsulating bellows 2' is disposed within the condition responsive bellows 1'. The end wall 3' of the bellows 1' is fixed and has the end wall 5' of the bellows 2' secured thereto. The opposite end of the bellows 1' is closed by a movable end wall 4' and the opposite end of the bellows 2' is closed by a movable end wall 6' secured to the movable end wall 4' of the bellows 1' for movement therewith.

The contacts 24' and 25' are encapsulated within the bellows 2'. The contact 25' has a stem which extends through the fixed ends of the bellows 1' and may be insulated therefrom by a suitable insulator 40. The contact 24' has a stem which extends through the movable ends of the bellows and may be insulated therefrom or it may, if desired, be in contact with the walls of the bellows for completion of the circuit to the contact 24' through the expansible and contractible wall of the bellows and the stem of the contact 24'. Circuit connections are shown more or less diagrammatically at 41 and 42 for connecting the contacts in the thermoelectric or other circuit and, for example, in circuit with the electromagnetic valve operator for heater control or other electromagnetic control means.

The temperature responsive means may include range adjusting means comprising, for example, spring loading means 43 adapted to bear, for example, against the movable end of the outer bellows 1' and rotatable cam means 44 for varying the rate of spring loading and hence the temperature setting of the device. The cam means 44 is effective to actuate a spring abutment member 45 through a stem 46 guided at 47 to vary the rate of spring loading.

The form of device shown in Figure 3 is primarily designed as a heater control whereas the device shown in Figures 1 and 2 is primarily designed as a refrigeration control and is described for that purpose. For use of the device shown in Figure 3 for heater control, the bellows 1' may be filled with a volatile fluid which is adapted to expand and contract with accompanying expansion and contraction of the bellows 1' upon changes in ambient temperature at the position at which the bellows 1' is disposed or where there is a temperature sensing bulb connected to the bellows 1' at the position at which such bulb is disposed.

Illustrative of suitable fills for the bellows 1' are those set forth in the copending application of Adolph J. Hilgert, Serial No. 265,445, filed January 8, 1952, namely, butane (which is a colorless gaseous compound—$C_4H_{10}$—of the aliphatic hydrocarbon or marsh-gas series), which at 70° F. will exert a pressure of approximately 31 pounds per square inch; iso-butane, which at 70° F. will exert a pressure of approximately 45 pounds per square inch; sulphur dioxide ($SO_2$), which at 70° F. will exert a pressure of approximately 50 pounds per square inch; methyl chloride ($CH_3Cl$), which at 70° F. will exert a pressure of approximately 72 pounds per square inch; "S-12" or Freon ($CCl_2F_2$), which at 70° F. will exert a pressure of approximately 85 pounds per square inch; and propane ($C_2H_8$), which at 70° F. will exert a pressure of approximately 120 pounds per square inch.

Other fills than those above indicated are contemplated for use in the bellows 1' where the device is intended for heat control purposes. If desired, a sub-atmospheric fill may be used as disclosed and claimed in the copending application of John A. Wolff, Serial No. 266,626, filed January 16, 1952. Such a fill has the advantage that, in case of rupture of the bellows, atmosphere will enter the bellows separating the contact 24' from the contact 25' and opening the circuit so that the device will fail-safe. Isopropyl alcohol is an example of such a sub-atmospheric fill for a maximum setting of 180° F. N-propyl alcohol is suitable for a maximum setting of about 200° F. Isobutyl alcohol is suitable for a maximum setting of about 220° F. N-butyl alcohol is suitable for a maximum setting of about 240° F. Isoamyl alcohol is suitable for a maximum setting of about 260° F. M-xylene is suitable for a maximum setting of about 280° F., and P-cymene is suitable for a maximum setting of about 340° F.

It is contemplated within the scope of the present invention that the form of device shown in Figure 3 may be used as a refrigerator control if employed in shunt circuit arrangement as shown in the copending application of Gerald E. Dietz and Adolph J. Hilgert, Serial No. 299,274, filed July 16, 1952, and if the bellows 1' is filled with the temperature responsive fills utilized in the bellows 1 of Figure 1 of the instant application.

Operation of the embodiment of the invention illustrated in Figure 3 is as follows:

When, for example, in heater control the temperature of the air or other medium surrounding the bellows 1' falls below that set, for example, by the cam means 44 at the position to which it is turned for the desired setting, the bellows 1' and 2' contract under the influence of the spring. The contact 24' gradually closes against contact 25' and the contact pressure builds up, for example, as previously stated, to at least the pressure where the resistance of the thermocouple circuit, or other circuit, is reduced to a value at which the electromagnetic operator is energized by the thermoelectric energy and actuates the valve or other controlling member to the desired position.

Upon rise of the order of a few tenths of a degree Fahrenheit or less in temperature at the temperature reponsive means above that set by the cam means 44, the bellows 1' and 2' expand and reduce the pressure of the contact 24' against the contact 25' at least to where the resistance of the circuit is increased to a value where the electromagnetic operator is deenergized and a valve or other controlling member is actuated to closed or other desired position.

In the form of device shown in Figure 1 and assuming it would be utilized with the type of two-rate fuel controlling apparatus disclosed in the copending application of Gerald E. Dietz and Adolph J. Hilgert, Serial No. 299,274, filed July 16, 1952, and further assuming the device to be in series relation electrically with the electromagnetic valve operator of such apparatus, it will be seen that if the bellows 1 has an above atmospheric fill, failure of the bellows will result in opening of the circuit and safe-failure in the sense of closing the main supply of fuel to the refrigerator but maintaining refrigeration at the lower rate. This is the preferred operation for ordinary refrigerators. On the other hand, if the bellows 1 of Figure 1 under the same conditions utilizes a sub-atmospheric fill, failure of the bellows 1 will result in closure of the electric circuit and opening of the main fuel supply to afford refrigeration at the higher rate. This may be desirable where the refrigerating means is a freezer or the like and the primary concern is to maintain goods in a frozen condition in the event of bellows failure.

Considering now the device shown in Figure 3 and considering it to be used in conjunction with space heater control means such as that disclosed in Gerald E. Dietz and Adolph J. Hilgert, Serial No. 292,488, filed June 9, 1952, filling of the bellows 1' with an above-atmospheric fill does not afford safe-failure, whereas a sub-atmospheric fill will, as has been previously described in the copending application of Adolph J. Hilgert, Serial No. 291,047, filed May 31, 1952. However, if the device of Figure 3 is utilized as a refrigerator control in conjunction with refrigeration control apparatus of the two-rate type disclosed in the copending application of Gerald E. Dietz and Adolph J. Hilgert, Serial No. 299,274, filed July 16, 1952, and further assuming the device of Figure 3 to be in shunt circuit relationship to the electromagnetic valve operator of the two-rate device, utilization of the above-atmospheric fill in the bellows 1' will, upon failure of the bellows, result in closure of the circuit or increase in contact pressure, closing of the valve and maintenance of refrigeration at a low rate, as is normally desired in ordinary refrigerators. On the other hand, if a sub-atmospheric fill is utilized, failure of the bellows 1' results in opening of the circuit or reduction in contact pressure, opening of the main valve and maintenance of refrigeration at the high rate, advantageous for freezers as aforeindicated.

The embodiments of the invention shown in the drawing are for illustrative purposes only and it is to be expressly understood that said drawing and the accompanying specification are not to be construed as a definition of the limits or scope of the invention, reference being had to the appended claims for that purpose.

I claim:

1. A condition responsive circuit controlling device including an electric circuit and comprising, in combination, a first enclosure expansible and contractible with change in a condition, a second expansible and contractible enclosure, and cooperating contacts encapsulated within said second enclosure for relative movement with expansion and contraction of said first enclosure to control flow of current through said circuit, said enclosures being disposed with one enclosure within the other enclosure and having coacting movable ends for expanding and contracting said second enclosure with expansion and contraction of said first enclosure.

2. A temperature responsive control device including a low voltage circuit and comprising, in combination, a pair of low resistance contacts, a first hermetically sealed expansible and contractible enclosure enclosing said contacts against exposure to the atmosphere and against contamination in use by formation thereon of oxide layers, said first enclosure containing an inert fill immersing said contacts and effective to prevent contamination and oxidation of said contacts, and a second hermetically sealed expansible and contractible enclosure out of communication with the interior of said first enclosure and containing a volatile fill which expands and contracts with accompanying expansion and contraction of said second enclosure with changes in temperature, said second enclosure coacting with said first enclosure for accompanying actuation of said first enclosure with expansion of said second enclosure to produce relative movement of said contacts for control of said circuit.

3. A condition responsive control device according to claim 2 wherein said low resistance contacts are normally in engagement within the range of control of said device and have their contact pressure varied by said relative movement thereof for control of said circuit.

4. A temperature responsive control device according to claim 2 wherein the volatile fill in said second enclosure has a pressure above atmospheric pressure under normal operating conditions.

5. A temperature responsive control device according to claim 2 wherein the volatile fill in said second enclosure has a pressure below atmospheric pressure under normal operating conditions.

6. A temperature responsive control device including a low voltage circuit and comprising, in combination, a pair of low resistance contacts, a first hermetically sealed expansible and contractible enclosure enclosing said contacts against exposure to the atmosphere and against contamination in use by formation thereon of oxide layers, said first enclosure containing an inert fill immersing said contacts and effective to prevent contamination and oxidation of said contacts, a second hermetically sealed expansible and contractible enclosure out of communication with the interior of said first enclosure and containing a volatile fill which expands and contracts with accompanying expansion and contraction of said second enclosure with changes in temperature, said second enclosure coacting with said first enclosure for accompanying actuation of said first enclosure with expansion of said second enclosure to produce relative movement of said contacts for control of said circuit, said first and second enclosures being disposed end-to-end, and an actuating connection interposed between adjacent ends of said enclosures for accompanying actuation of said first enclosure with expansion of said second enclosure to produce relative movement of said contacts for control of said circuit.

7. A temperature responsive control device including a low voltage circuit and comprising, in combination, a pair of low resistance contacts, a first hermetically sealed expansible and contractible enclosure enclosing said contacts against exposure to the atmosphere and against contamination in use by formation thereon of oxide layers, said first enclosure containing an inert fill immersing said contacts and effective to prevent contamination and oxidation of said contacts, a second hermetically sealed expansible and contractible enclosure out of communication with the interior of said first enclosure and containing a volatile fill which expands and contracts with accompanying expansion and contraction of said second enclosure with changes in temperature, said second enclosure coacting with said first enclosure for accompanying actuation of said first enclosure with expansion of said second enclosure to produce relative movement of said contacts for control of said circuit, said first and second enclosures being disposed end-to-end, an actuating connection interposed between adjacent ends of said enclosures for accompanying actuation of said first enclosure with expansion of said second enclosure to produce relative movement of said contacts for control of said circuit, and temperature adjusting means having a part thereof extending between the adjacent ends of said enclosures and through a slot in said actuating connection.

8. A temperature responsive control device including a low voltage circuit and comprising, in combination, a pair of low resistance contacts, a first hermetically sealed expansible and contractible enclosure enclosing said contacts against exposure to the atmosphere and against contamination in use by formation thereon of oxide layers, said first enclosure containing an inert fill immersing said contacts and effective to prevent contamination and oxidation of said contacts, a second hermetically sealed expansible and contractible enclosure out of communication with the interior of said first enclosure and containing a volatile fill with expands and contracts with accompanying expansion and contraction of said second enclosure with changes in temperature, said second enclosure coacting with said first enclosure for accompanying actuation of said first enclosure with expansion of said second enclosure to produce relative movement of said contacts for control of said circuit, said first and second enclosures being disposed end-to-end, an actuating connection interposed between adjacent ends of said enclosures for accompanying actuation of said first enclosure with expansion of said second enclosure to produce a relative movement of said contacts for control of said circuit, temperature adjusting means having a part thereof extending between the adjacent ends of said enclosures and through a slot in said actuating connection, said temperature adjusting means including a knob having a cam surface which cooperates with said part extending between adjacent ends of said enclosures, and a factory adjustment screw having screwed cooperation with said knob and coacting with the adjacent end of said second enclosure for factory adjustment of said device.

9. A temperature responsive control device including a low voltage circuit and comprising, in combination, a pair of low resistance contacts, a first hermetically sealed expansible and contractible enclosure enclosing said contacts against exposure to the atmosphere and against contamination in use by formation thereon of oxide layers, said first enclosure containing an inert fill immersing said contacts and effective to prevent contamination and oxidation of said contacts, a second hermetically sealed expansible and contractible enclosure out of communication with the interior of said first enclosure and containing a volatile fill which expands and contracts with accompanying expansion and contraction of said second enclosure with changes in temperature, said second enclosure coacting with said first enclosure for accompanying actuation of said first enclosure with expansion of said second enclosure to produce relative movement of said contacts for control of said circuit, said first and second enclosures being disposed end-to-end, an actuating connection interposed between adjacent ends of said enclosure for accompanying actuation of said first enclosure with expansion of said second enclosure to produce a relative movement of said contacts for control of said circuit, temperature adjusting means having a part thereof extending between the adjacent ends of said enclosures and through a slot in said actuating connection, said temperature adjusting means including a knob having a cam surface which cooperates with said part extending between adjacent ends of said enclosures, a factory adjustment screw having screwed cooperation with said knob and coacting with the adjacent end of said second enclosure for factory adjustment of said device, a base plate supporting said first enclosure, a bracket carried by said base plate and supporting said knob for turning movement, an electric conducting stem extending out through said base plate and having a contact tip at its outer end, and a threaded part on said base plate for receiving an attaching nut for connecting a concentric lead to said contacts with a terminal contact on the inner lead conductor of said lead in contact with said terminal tip.

10. A temperature responsive control device including a low voltage circuit and comprising, in combination, a pair of low resistance contacts, a first hermetically sealed expansible and contractible enclosure enclosing said contacts against exposure to the atmosphere and against contamination in use by formation thereon of oxide layers, said first enclosure containing an inert fill immersing said contacts and effective to prevent contamination and oxidation of said contacts, a second hermetically sealed expansible and contractible enclosure out of communication with the interior of said first enclosure and containing a volatile fill which expands and contracts with accompanying expansion and contraction of said second enclosure with changes in temperature, said second enclosure coacting with said first enclosure for accompanying actuation of said first enclosure with expansion of said second enclosure to produce relative movement of said contacts for control of said circuit, a bulb positioned at remote location, and a tube connecting the interior of said bulb in communication with the interior of said second enclosure.

11. A temperature responsive control device including a low voltage circuit and comprising, in combination, a pair of low resistance contacts, a first hermetically sealed expansible and contractible enclosure enclosing said contacts against exposure to the atmosphere and against contamination in use by formation thereon of oxide layers, said first enclosure containing an inert fill immersing said contacts and effective to prevent contamination and oxidation of said contacts, and a second hermetically sealed expansible and contractible enclosure out of communication with the interior of said first enclosure and containing a voltatile fill which expands and contracts with accompanying expansion and contraction of said second enclosure with changes in temperature, said second enclosure coacting with said first enclosure for accompanying actuation of said first enclosure with expansion of said second enclosure to produce relative movement of said contacts for control of said circuit, said first and second enclosures being disposed with one of said enclosures enclosed within the other enclosure and with said second enclosure coacting with said first enclosure for accompanying actuation of said first enclosure with expansion of said second enclosure to produce relative movement of said contacts for control of said circuit.

12. A temperature responsive control device including a low voltage circuit and comprising, in combination, a pair of low resistance contacts, a first hermetically sealed expansible and contractible enclosure enclosing said contacts against exposure to the atmosphere and against contamination in use by formation thereon of oxide layers, said first enclosure containing an inert fill immersing said contacts and effective to prevent contamination and oxidation of said contacts, a second hermetically sealed expansible and contractible enclosure out of communication with the interior of said first enclosure and containing a voltatile fill which expands and contracts with accompanying expansion and contraction of said second enclosure with changes in temperature, said second enclosure coacting with said first enclosure for accompanying actuation of said first enclosure with expansion of said second enclosure to produce relative movement of said contacts for control of said circuit, and temperature adjusting means coacting endwise with at least one end of one of said enclosures for temperature adjustment.

13. A condition responsive circuit controlling device for low power circuits comprising, in combination, a pair of low resistance contacts, an hermetically sealed expansible and contractible enclosure enclosing said contacts, said contacts being normally in engagement within the range of control of said device, and condition responsive means external to said enclosure coacting mechanically with said enclosure mechanically to change the dimensions of said enclosure to thereby vary the contact pressure between said engaged contacts in response to changes in the condition.

14. A condition responsive circuit controlling device for low power circuits comprising, in combination, a pair of low resistance contacts, an hermetically sealed expansible and contractible enclosure enclosing said contacts and biasing the latter in the direction of separation thereof, biasing means for loading said enclosure in opposition to the bias thereof wherefore said contacts are normally in engagement within the range of control of said device, and condition responsive means external to said enclosure coacting mechanically with said enclosure mechanically to change the dimensions of said enclosure to thereby vary the contact pressure in response to changes in the condition.

15. A temperature responsive control device for low voltage circuits comprising, enclosure means defining a pair of hermetically sealed expansible and contractible enclosures, a first low resistance electrical contact in the first of said enclosures, said enclosure means including movable end wall and contact means affording a movable end wall for each of said enclosures and a movable low resistance second electrical contact having cricuit-controlling coaction with said first contact within said first enclosure, said first enclosure containing an inert fill, and said second enclosure containing a fluid fill expansible and contractible in response to changes in temperature to effect corresponding movement of said end wall and contact means and thereby circuit controlling movement of said contact with respect to said first contact.

16. A temperature responsive control device for low voltage circuits comprising, enclosure means defining a pair of hermetically sealed expansible and contractible enclosures, a first low resistance electrical contact in the first of said enclosures, said enclosure means including movable end wall and contact means affording a movable end wall for each of said enclosures and a movable low resistance second electrical contact having circuit controlling coaction with said first contact within said first enclosure, said first enclosure containing an inert fill, and said second enclosure containing a fluid fill expansible and contractible in response to changes in temperature to effect corresponding movement of said end wall and contact means and thereby circuit controlling movement of said second contact with respect to said first contact, and adjustable biasing means cooperable with said wall and contact means for adjusting the temperature control point of said device.

17. A temperature responsive control device for low voltage circuits comprising, enclosure means defining a pair of hermetically sealed expansible and contractible enclosures, a first low resistance electrical contact in the first of said enclosures, said enclosure means including movable end wall and contact means affording a movable end wall for each of said enclosures and a movable low resistance second electrical contact having circuit controlling coaction with said first contact within said first enclosure, said first enclosure containing an inert fill, and said second enclosure containing a fluid fill expansible and contractible in response to changes in temperature to effect corresponding movement of said end wall and contact means and thereby circuit controlling movement of said second contact with respect to said first contact, and adjustable biasing means comprising a spring cooperable with said wall and contact means, and a manually rotatable cam member coacting with said spring for adjusting the temperature control point of said device.

18. A temperature responsive control device for low voltage circuits comprising, enclosure means defining a pair of hermetically sealed expansible and contractible enclosures, a first low resistance electrical contact in the first of said enclosures, said enclosure means including movable end wall and contact means affording a movable end wall for each of said enclosures and a movable low resistance second electrical contact having circuit controlling coaction with said first contact within said first enclosure, said first enclosure containing an inert fill, and said second enclosure containing a fluid fill expansible and contractible in response to changes in temperature to effect corresponding movement of said end wall and contact means and thereby circuit controlling movement of said second contact with respect to said first contact, means for adjusting the temperature control point of said device comprising a biasing spring cooperable with said wall and contact means and a manually engageable knob operatively coacting with said spring for adjusting the bias of the latter, and a factory adjustment screw having screwed cooperation with said knob and coacting with an adjacent wall portion of one of said enclosures for factory adjustment of said device.

19. A temperature responsive control device for low voltage circuits comprising, enclosure means defining a pair of hermetically sealed expansible and contractible enclosures, a first low resistance electrical contact in the first of said enclosures, said enclosure means including movable end wall and contact means affording a movable end wall for each of said enclosures and a movable low resistance second electrical contact having circuit-controlling coaction with said first contact within said first enclosure, said first enclosure containing an inert fill, and said second enclosure containing a fluid fill expansible and contractible in response to changes in temperature to effect corresponding movement of said end wall and contact means and thereby circuit controlling movement of said second contact with respect to said first contact, said temperature responsive fill having under normal operating conditions a pressure below atmospheric pressure.

20. A temperature responsive control device for low voltage circuits comprising, enclosure means defining a pair of hermetically sealed expansible and contractible enclosures, a first low resistance electrical contact in the first of said enclosures, said enclosure means including movable end wall and contact means affording a movable end wall for each of said enclosures and a movable low resistance second electrical contact having circuit-controlling coaction with said first contact within said first enclosure, said first enclosure containing an inert fill, and said second enclosure containing a fluid fill expansible and contractible in response to changes in temperature to effect corresponding movement of said end wall and contact means and thereby circuit controlling movement of said second contact with respect to said first contact, said first and second contacts being normally in engagement within the range of control of said device, said movement of said end wall and contact means effecting variation in the contact pressure between said engaged contacts.

References Cited in the file of this patent

UNITED STATES PATENTS

| | | |
|---|---|---|
| 1,265,765 | Ferris | May 14, 1918 |
| 1,332,469 | Matthews | Mar. 2, 1920 |
| 1,505,370 | Buch et al. | Aug. 19, 1924 |
| 1,801,736 | Greenwood | Apr. 21, 1931 |
| 1,836,654 | Dorn et al. | Dec. 15, 1931 |
| 1,952,571 | Smith | Mar. 27, 1934 |
| 1,959,591 | Lowe | May 22, 1934 |
| 2,474,369 | Ray | June 28, 1949 |
| 2,493,190 | Fuchs | Jan. 3, 1950 |

FOREIGN PATENTS

| | | |
|---|---|---|
| 276,641 | Great Britain | Oct. 26, 1928 |